United States Patent
Acharya et al.

(10) Patent No.: US 7,133,575 B2
(45) Date of Patent: Nov. 7, 2006

(54) ARCHITECTURE FOR PROCESSING FINGERPRINT IMAGES

(75) Inventors: Tinku Acharya, Chandler, AZ (US); Bhargab B. Bhattacharya, Calcutta (IN); Partha Bhowmick, Durgapur (IN); Arijit Bishnu, Calcutta (IN); Jayanta K. Dey, Calcutta (IN); Malay K. Kundu, Calcutta (IN); Chivukula Anjaneya Murthy, Calcutta (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/888,216

(22) Filed: Jul. 9, 2004

(65) Prior Publication Data
US 2004/0240714 A1   Dec. 2, 2004

Related U.S. Application Data

(63) Continuation of application No. 09/952,276, filed on Sep. 13, 2001, now Pat. No. 6,795,592.

(51) Int. Cl.
    G06K 9/54   (2006.01)

(52) U.S. Cl. .................................. 382/307; 382/124

(58) Field of Classification Search ................ 382/124, 382/125, 190, 205, 304, 307, 218; 358/534, 358/530
See application file for complete search history.

(56) References Cited

U.S. PATENT DOCUMENTS

| | | | |
|---|---|---|---|
| 4,791,678 A | 12/1988 | Iwase et al. | |
| 5,109,428 A | 4/1992 | Igaki et al. | |
| 5,963,675 A | 10/1999 | van der Wal et al. | |
| 5,974,163 A | 10/1999 | Kamei | |
| 6,289,112 B1 | 9/2001 | Jain et al. | |
| 6,611,614 B1 * | 8/2003 | Jung et al. | 382/125 |

FOREIGN PATENT DOCUMENTS

| | | | |
|---|---|---|---|
| FR | 2 582 831 A1 | | 12/1986 |
| FR | 2582831 | * | 12/1986 |
| WO | WO 99/33018 | | 7/1999 |

OTHER PUBLICATIONS

Ratha , et al., "Adaptive Flow Orientation-Based Feature Extraction In Fingerprint Images", XP 000539636, Pattern Recognition, vol. 28, No. 11, Nov. 28, 1995, pp. 1657-1671.

* cited by examiner

Primary Examiner—Yon J. Couso
(74) Attorney, Agent, or Firm—Paul E. Steiner

(57) ABSTRACT

Embodiments of an architecture for processing gray-level images is disclosed.

19 Claims, 4 Drawing Sheets

Circuit Block $Ck_1$

ARCHITECTURE FOR PROCESSING FINGERPRINT IMAGES

The present patent application is a Continuation of application Ser. No. 09/952,276, filed Sept. 13, 2001 now U.S. Pat. No. 6,795,592.

RELATED APPLICATIONS

This patent application is related to concurrently filed U.S. patent application Ser. No. 09/952,248, titled "Method and Apparatus to Provide a Binary Fingerprint Image," filed Sep. 13, 2001, by Acharya et al., and to concurrently filed U.S. patent application Ser. No. 09/952,249, titled "Method and Apparatus to Reduce False Minutiae from a Binary Fingerprint Image," filed on Sep. 13, 2001, by Acharya et al., both assigned to the assignee of the presently claimed subject matter and herein incorporated by reference.

BACKGROUND

This disclosure is related to classification and feature extraction.

Feature extraction is a current area of research and development in digital image processing and computer vision, particularly in areas of development involving feature based pattern recognition. Many image recognition, image detection, and biometrics applications, for example, have been developed based on techniques of feature extraction and pattern recognition. Feature extraction in fingerprint images has unique aspects compared to general purpose image processing applications at least in part due to its special topological characteristics. Most of the approaches proposed in the literature transform a fingerprint image into a binary image based at least in part on convolution of the image with a filter coupled with certain variants of thresholding. However, this approach has several disadvantages, such as computational intensity and the inability to robustly address noisy images. Moreover, most of the methods in the literature are slow, complicated, and difficult to implement in hardware. A need, therefore, exists for other processing techniques and architectures to support such techniques.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

The claimed subject matter relates to implementing an on-chip VLSI implementation of pixel classification using the topological features. In one embodiment, features such as crest, valley, plateau and undecided, as disclosed in previously referenced U.S. patent application Ser. No. 09/952,248, are employed, although, of course, the claimed subject matter is not limited in scope to employing the approach disclosed therein. Any one of a number of approaches to pixel classification are capable of being implemented that fall within the scope of the claimed subject matter.

Nonetheless, in the aforementioned approach, a first pass over a image-pixel matrix resolves pixels to seven classes, namely CR, VA, PL, CV, VP, CP and UN, as described in the aforementioned application. Of the seven classes, CR (crest), VA (valley), PL (plateau) are final classes in a described embodiment of the aforementioned application.

Figure 1:
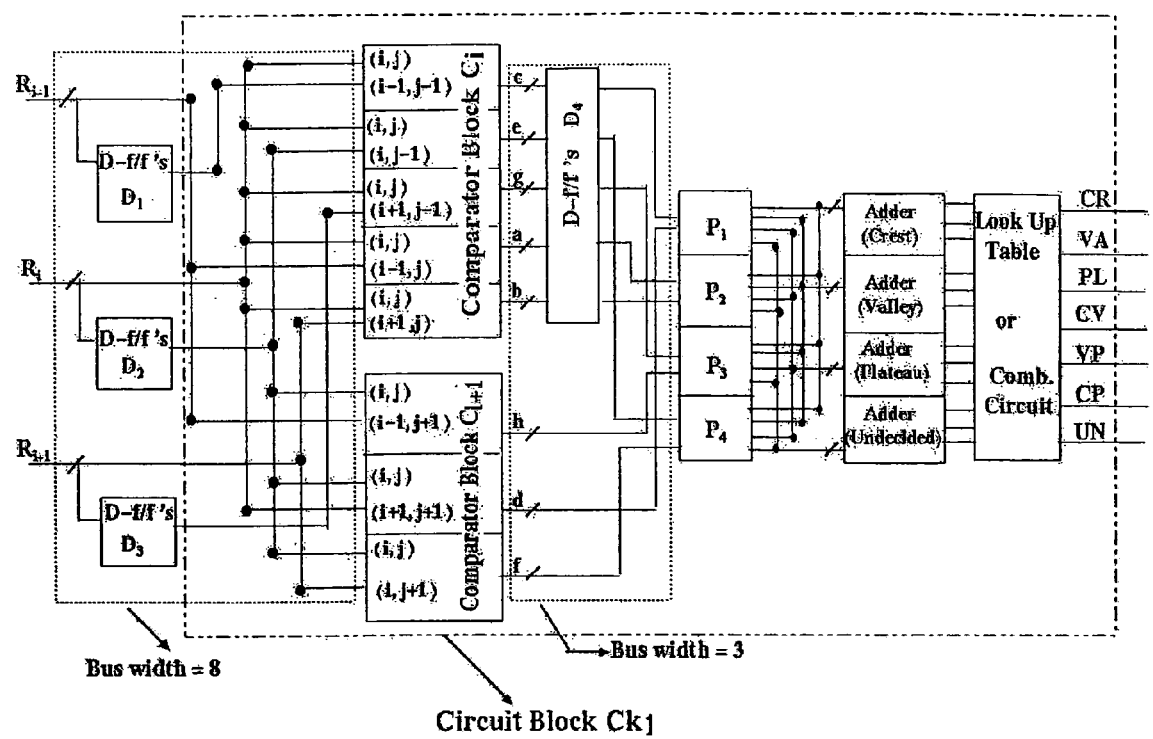
FIG. 1 is a schematic diagram showing an portion of an embodiment of a processing element (PE) that may be used to classify a pixel.

For this particular embodiment of an architecture for processing images, a processing element 10 (PE) to classify a pixel, such as into the above seven classes, is shown in FIG. 1. An image-pixel matrix of 'm' rows and 'n' columns may, for example, employ in this embodiment 'm' copies of the PE, although the claimed subject matter is not limited in scope in this respect. In this embodiment, the pixels in several columns are 'fired' during a clock pulse. Thus, in this embodiment, columns are fed in a pipeline fashion into the PEs.

Consider, for example, a pixel at the $(i, j)^{th}$ location. Processing element $PE_i$, in this embodiment, has three (3) input lines $R_{i-1}$, $R_i$ and $R_{i+1}$, corresponding to rows i−1, i and i+1. To classify a pixel at (i, j), employing the approach previously described, pixels in its 3×3 neighborhood are accessed. The pixels at location having indices i−1, i and i+1 may be obtained from input lines $R_{i-1}$, $R_i$ and $R_{i+1}$ respectively. Also note that pixels at locations having the same 'j' indices are fired during the same clock, e.g., (i−1, j), (i, j) and (i+1, j) are fired during the same clock pulse or instant, say, for example, $t_j$; then (i−1, j−1), (i, j−1) and (i+1, j−1) are fired during time or pulse $t_j-1$ and (i−1, j+1), (i, j+1) and (i+1, j+1) would be fired during time or pulse $t_j+1$.

The following table shows the pixels employed to calculate a, b, c, d, e, f, g and h, which are employed to classify a particular pixel into one of the seven classes of the aforementioned patent application, as well as the clock pulse at which it would be available.

TABLE 1

| | Pixels Needed | Input line at which it is available | Time at which it is available | Pixels Needed | Input Line at which it is available | Time at which it is available |
|---|---|---|---|---|---|---|
| a | i, j | $R_i$ | $t_j$ | i − 1, j | $R_{i-1}$ | $t_j$ |
| b | i, j | $R_i$ | $t_j$ | i + 1, j | $R_{i+1}$ | $t_j$ |
| c | i, j | $R_i$ | $t_j$ | i − 1, j − 1 | $R_{i-1}$ | $t_j - 1$ |

TABLE 1-continued

| | Pixels Needed | Input line at which it is available | Time at which it is available | Pixels Needed | Input Line at which it is available | Time at which it is available |
|---|---|---|---|---|---|---|
| d | i, j | $R_i$ | $t_j$ | i + 1, j + 1 | $R_{i+1}$ | $t_j + 1$ |
| e | i, j | $R_i$ | $t_j$ | i, j − 1 | $R_i$ | $t_j − 1$ |
| f | i, j | $R_i$ | $t_j$ | i, j + 1 | $R_i$ | $t_j + 1$ |
| g | i, j | $R_i$ | $t_j$ | i + 1, j − 1 | $R_{i+1}$ | $t_j − 1$ |
| h | i, j | $R_i$ | $t_j$ | i − 1, j + 1 | $R_{i−1}$ | $t_j − 1$ |

For example, as shown, a,b may be evaluated at the $t_j^{th}$ clock pulse. To calculate c, e and g at the $t_j^{th}$ clock pulse, the data at input lines $R_i$, $R_{i-1}$ and $R_{i+1}$ at $(t_j-1)^{th}$ clock pulse and $R_i$ at $t_j^{th}$ clock pulse is employed. To accomplish this, data at input line may be delayed for one clock. D flip-flops 20, $D_1$, $D_2$, and $D_3$, as shown in FIG. 1, accomplishes this for this embodiment. For calculating h, d and f, the data at input lines $R_i$, $R_{i-1}$ and $R_{i+1}$ are employed on the $t_j+1$ clock pulse and $R_i$ at $t_j^{th}$ clock pulse. Therefore, D flip-flop $D_2$ holds back the data at input line $R_i$ in this embodiment.

The comparator block 30, $C_i$, has five(5) 8-bit magnitude comparators, for a, b, c, e and g, in this embodiment. At the clock pulse $t_j$, $C_i$ calculates a, b, c, e and g for the pixel at location (i, j) of the image pixel matrix. Comparator block 40, $C_{i+1}$, has three(3) 8-bit magnitude comparators, for d, h and f, in this embodiment. $C_{i+1}$ calculates d, h and f for the pixel at location (i, j) at the $(t_j+1)^{th}$ clock pulse. Note that at clock pulse $(t_j+1)$, $C_i$ calculates a, b, c, e and g corresponding to the pixel at location (i, j+1) of the pixel-matrix; $C_i+1$ calculates d, h and f corresponding to the pixel at location (i, j−1) at the clock pulse $t_j$.

In this particular embodiment h, d and f are available one clock pulse after the availability of a, b, c, e and g. Therefore, a, b, c, e and g are delayed for a clock pulse, here by a bank 50 of D flip-flops, $D_4$. Likewise, in this embodiment a bus-width of three binary signal values is employed for a, b, c, d, e, f, g and h. Specifically, the output signals of the magnitude comparators in this embodiment includes '+', '−' or '0'. Of course, in this embodiment, one line of the comparator circuit goes high.

Figure 3:
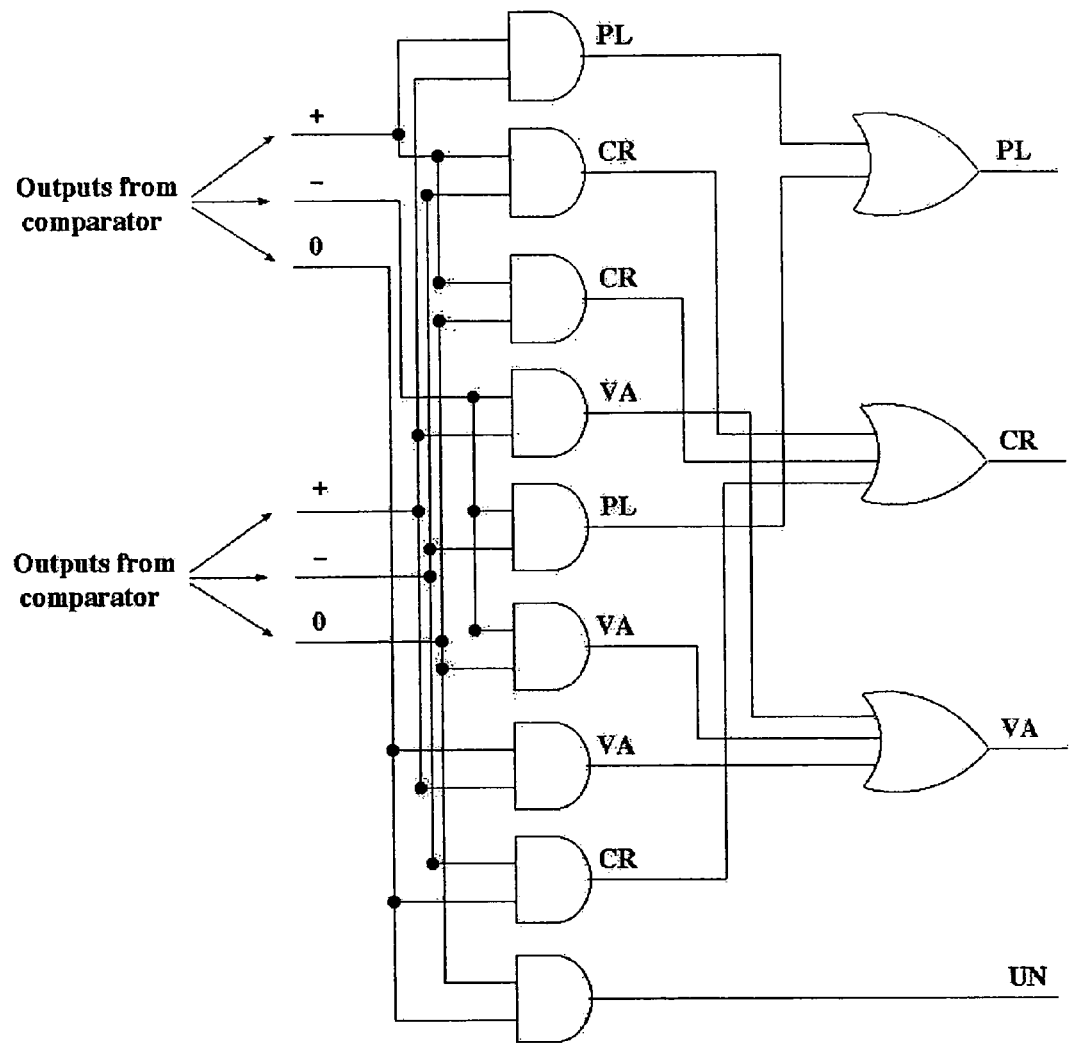
FIG. 3 is a schematic diagram showing another portion of the embodiment of FIG. 1 in more detail.

The output signals for a, b, c, d, e, f, g and h are then fed into four(4) combinational circuits 60, $P_1$, $P_2$, $P_3$ and $P_4$ in this embodiment. These circuits combine c with d, a with b, g with h, and e with f, respectively. The combinational circuits $P_1$ to $P_4$ shown in FIG. 3 in more detail, for this particular embodiment, implement a table shown in FIG. 3 of the aforementioned patent application Ser. No. 09/952,248, although, again, the claimed subject matter is not limited in scope in this respect. In this embodiment, along any of the directions (a, b), (c, d), (e, f) or (g, h), a crest, valley, plateau, or undecided classification may result. So, out of the four (4) output lines, a line being 1-bit wide in this embodiment, one line may go high indicating the presence of a crest, valley, plateau or an undecided classification.

This embodiment also employs four (4) adders, 70. The CR, VA, PL and UN 1-bit output lines here, as shown in FIG. 1, are fed respectively to Crest-adder, Valley-adder, Plateau-adder and Undecided-adder (also indicated hereinafter as $Adder_C$, $Adder_V$, $Adder_P$, and $Adder_U$). With four (4) directions, three(3) bits are employed in this embodiment to represent the sum of the adders to capture the situation where the same classification occurs for each direction. The output signals from the adders are fed into a Look-up Table($LUT_1$) 90 implementing the classification scheme depicted by the table in FIG. 4 in aforementioned application Ser. No. 09/952,248. This may, of course, be implemented any one of a number of ways, including using combinational circuitry. The claimed subject matter is not limited in scope to a particular implementation technique.

Figure 2:
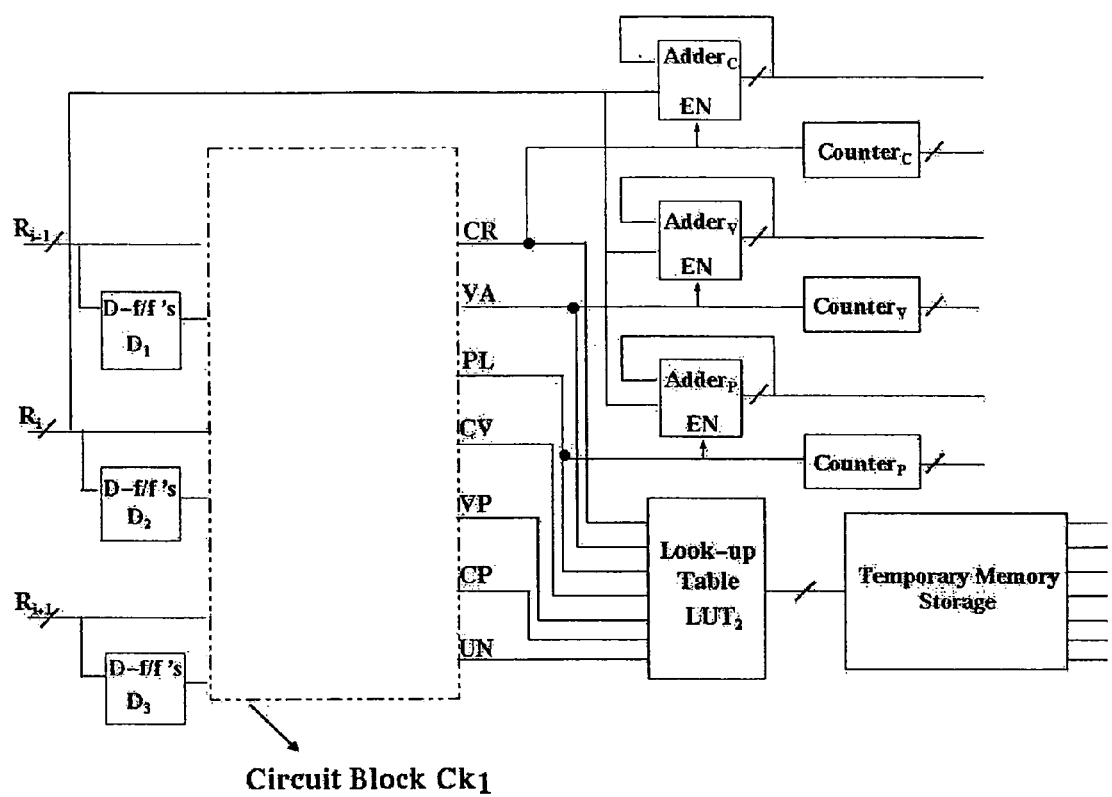
FIG. 2 is a schematic diagram showing additional portions of the embodiment of a processing element of FIG. 1.

Circuit block 80, $CK_1$, as shown in FIGS. 1 and 2, has seven (7) output lines CR, VA, PL, CV, VP, CP and UN. According to the Look-up Table or combinational circuit implementation of the classification scheme one of the seven lines goes high.

This embodiment also includes the capability to calculate the average gray-value of the crest, valley and plateau pixels to classify CV, VP, CP and UN types of pixels in a second pass, as illustrated in FIG. 2. As any one of the seven (7) output lines from the circuit block $CK_1$ goes high, output lines CR, VA or PL are used to enable adders $Adder_C$, $Adder_V$ and $Adder_P$, respectively. The input lines, $R_i$'s, are fed into adders $Adder_C$, $Adder_V$ and $Adder_P$. Based on the enable signal to the adders, one of the adders, such as $Adder_C$, $Adder_V$ and $Adder_P$, is selected and the addition is done. The counters, such as $Counter_C$, $Counter_V$ and $Counter_P$, count the number of enable signals to the respective adders, thereby, giving the number of crests, valleys and plateau pixels present in the image-pixel matrix. Thus, $Adder_C$ and $Counter_C$, for example, has the sum of the gray level values of the crest pixels in that particular row and the number of such crests in that row, respectively.

In this embodiment, after the entire image pixel matrix has been 'fired,' the values from the $Adder_C$s are added and the values from the $Counter_C$s are added. The sum from the adders is divided by the sum of the values of the counters to get the average crest gray level value. A similar operation may be performed for valley and plateau pixels.

After the first pass, the m×n pixels present in the image pixel matrix are classified into seven classes. These pixels may be stored in a temporary storage for further processing in the second pass. Look-up Table ($LUT_2$) 120 is used to decode the seven(7) output lines to a pre-specified value, as set in the $LUT_2$, to reflect the classifications the pixels may acquire.

Figure 4:
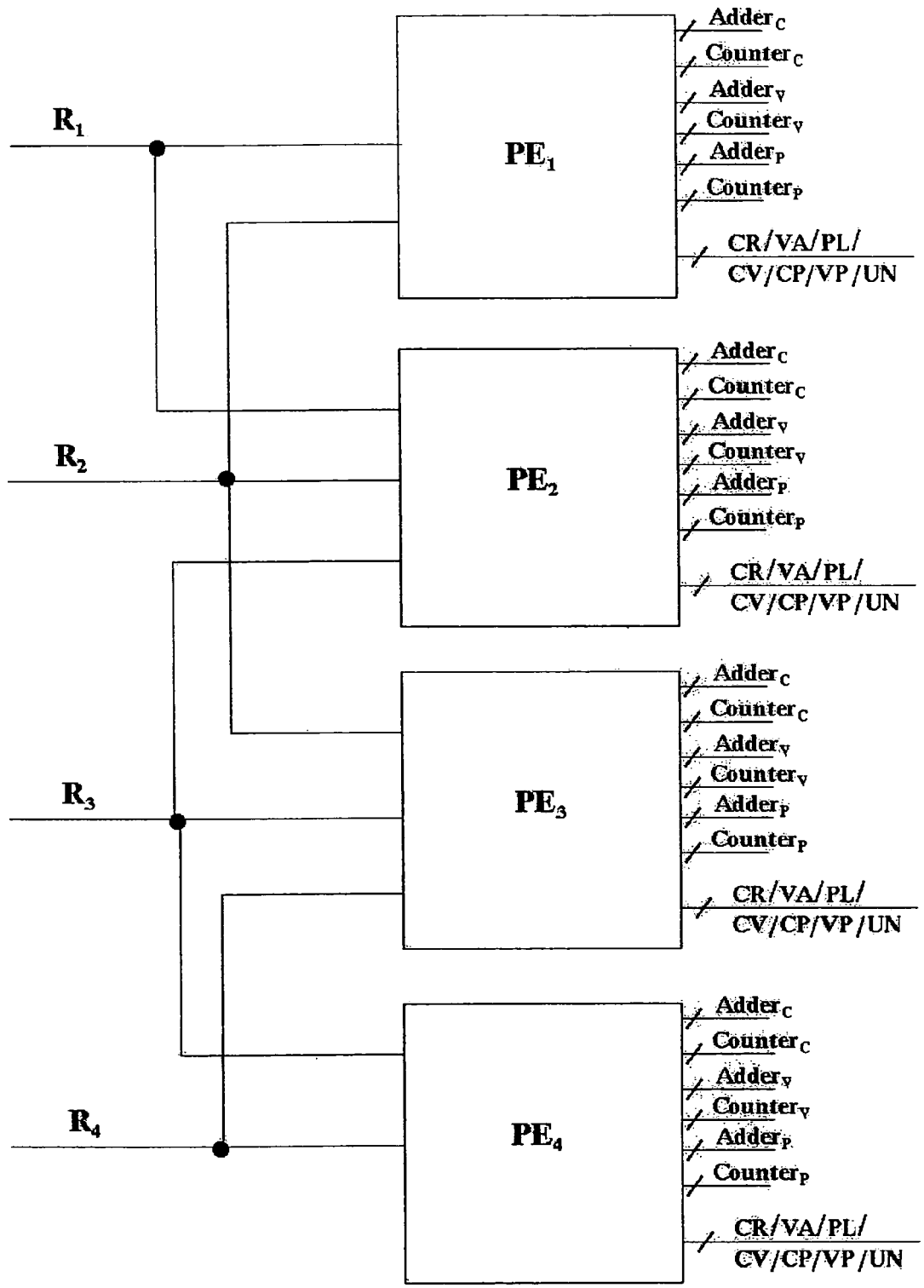
FIG. 4 is a schematic diagram showing a particular embodiment which combines several PE embodiments of FIG. 1, the PE embodiments combined in this particular embodiment to process a 4×5 image.

Thus, this embodiment may be employed to implement a VLSI architecture for computation of topological features for gray-level images. For example, FIG. 4 illustrates an embodiment for processing a 4×5 image using several of the PE embodiments previously described. These topological features may be used to extract a binary image from a gray-scale image. For example, as described in aforementioned patent application Ser. No. 09/952,248, this binary image may then be used for fingerprint analysis, as described, for example, in aforementioned patent application Ser. No. 09/952,249, although, again, this is just one example and the claimed subject matter is not limited in scope to employing the approaches in either of these applications. Furthermore, such an embodiment may be applied to other situations as well, such as to perform edge detection of general image processing applications, such as may be incorporated in Computer Vision, Pattern Recognition and other image processing architectures.

It will, of course, be understood that, although particular embodiments have just been described, the claimed subject matter is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging or fingerprint image system, for example, may result in an embodiment of a method in accordance with the claimed subject matter being executed, such as an embodiment of a method of providing a binary fingerprint image, for example, as previously described. For example, an image processing platform or an image processing system may include an image processing unit, an image input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. An image processing apparatus, comprising:
a plurality of processing elements adapted to classify a pixel into one of a plurality of classes, with each processing element corresponding to one row of an m row by n column digital image to be processed, wherein each processing element is coupled to receive three adjacent row inputs and comprises:
a first delay section adapted to selectively delay the three adjacent row inputs;
a comparator section adapted to receive inputs from the three adjacent row inputs and the first delay section and to provide a plurality of outputs corresponding to the gradient of the gray-levels in a neighborhood of pixels immediately surrounding the pixel to be classified; and
an output section configured to output a classification of the pixel based on the outputs of the comparator section.

2. The image processing apparatus of claim 1, wherein output values for the plurality of outputs from the comparator section correspond to one of a positive, a negative or a substantially zero gradient.

3. The image processing apparatus of claim 1, wherein the comparator section comprises a second delay section adapted to selectively delay a portion of the plurality of outputs.

4. The image processing apparatus of claim 1, wherein the comparator section includes two comparator blocks, each block having multiple comparators.

5. The image processing apparatus of claim 1, wherein the three adjacent row inputs are coupled to the processing element so as to apply pixel signal values in the same column and three adjacent rows to the processing element at substantially the same time.

6. The image processing apparatus of claim 1, wherein the output section comprises:
a first logic section adapted to combine selective ones of the plurality of outputs from the comparator section to determine preliminary classifications based on the selected combinations.

7. The image processing apparatus of claim 6, wherein the output section further comprises:
an adder section adapted to add a number of occurrences of a same preliminary classification from the first logic section.

8. The image processing apparatus of claim 7, wherein the output section further comprises:
a second logic section adapted to output the classification of the pixel based on the output of the adder section.

9. The image processing apparatus of claim 8, wherein the second logic section comprises a look-up table.

10. The image processing apparatus of claim 1, further comprising:
a circuit adapted to calculate an average grey-value for pixels falling into selected ones of the plurality of classes.

11. The image processing apparatus of claim 10, wherein the circuit comprises:
an adder circuit corresponding to each one of the plurality of classes to be averaged; and
a counter circuit corresponding to each one of the plurality of classes to be averaged.

12. The image processing apparatus of claim 1, further comprising:
a look-up table coupled to receive the classification of the pixel from the output section and configured to determine a final classification for the pixel if the processing element did not determine the final classification for the pixel.

13. An image processing system, comprising:
an input device to input a digital image;
a memory to store the digital image; and
a plurality of processing elements adapted to classify a pixel into one of at least five classes including three final classes, with each processing element corresponding to one row of the digital image to be processed, wherein each processing element is coupled to receive three adjacent row inputs and comprises:
a first delay section adapted to selectively delay the three adjacent row inputs;
a comparator section adapted to receive inputs from the three adjacent row inputs and the first delay section and to provide a plurality of outputs corresponding to the gradient of the gray-levels in a neighborhood of pixels immediately surrounding the pixel to be classified; and
an output section configured to output a classification of the pixel based on the outputs of the comparator section.

14. The image processing system of claim 13, wherein output values for the plurality of outputs from the comparator section correspond to one of a positive, a negative or a substantially zero gradient.

15. The image processing system of claim 13, wherein the comparator section comprises a second delay section adapted to selectively delay a portion of the plurality of outputs.

16. The image processing system of claim 13, wherein the comparator section includes two comparator blocks, each block having multiple comparators.

17. The image processing system of claim 13, wherein the three adjacent row inputs are coupled to the processing element so as to apply pixel signal values in the same column and three adjacent rows to the processing element at substantially the same time.

18. The image processing system of claim 13, wherein the output section comprises:
a first logic section adapted to combine selective ones of the plurality of outputs from the comparator section to determine preliminary classifications based on the selected combinations;

an adder section adapted to add a number of occurrences of a same preliminary classification from the first logic section; and a look-up table configured to output the classification of the pixel based on the output of the adder section.

19. The image processing system of claim 13, further comprising:

a look-up table coupled to receive the classification of the pixel from the output section and configured to re-classify the pixel if the classification of the pixel is not one of the three final classes.

* * * * *